April 16, 1929. R. A. HEISING 1,708,944
SYSTEM FOR NEUTRALIZING CAPACITIVE REACTANCE BETWEEN
TWO CIRCUITS PLACED CLOSE TO EACH OTHER
Filed Aug. 17, 1920
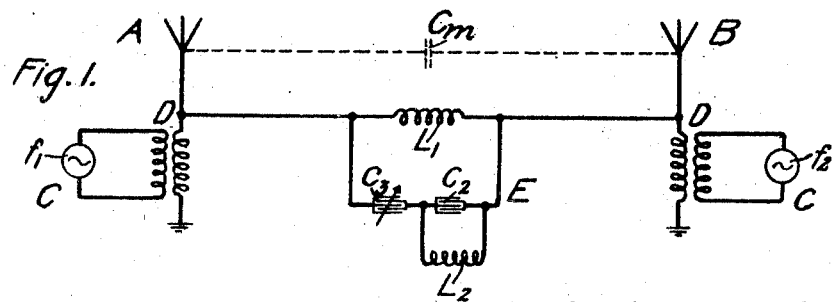
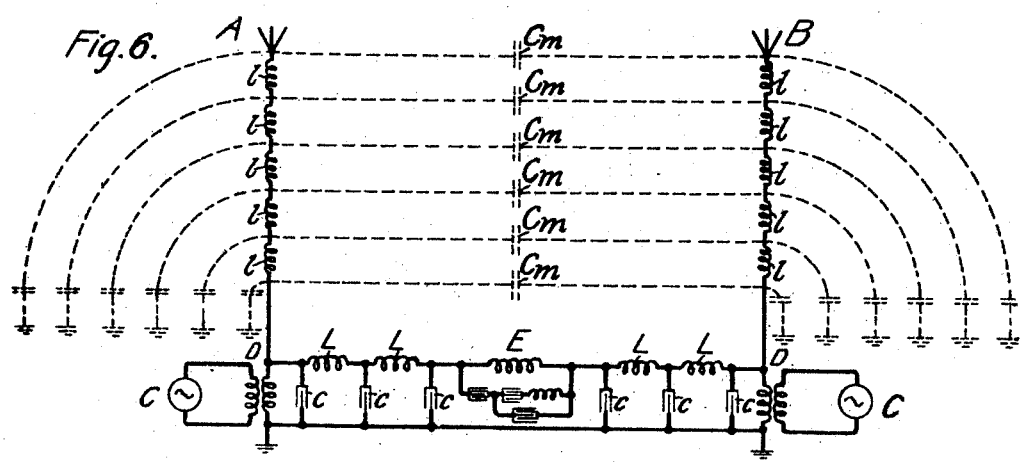
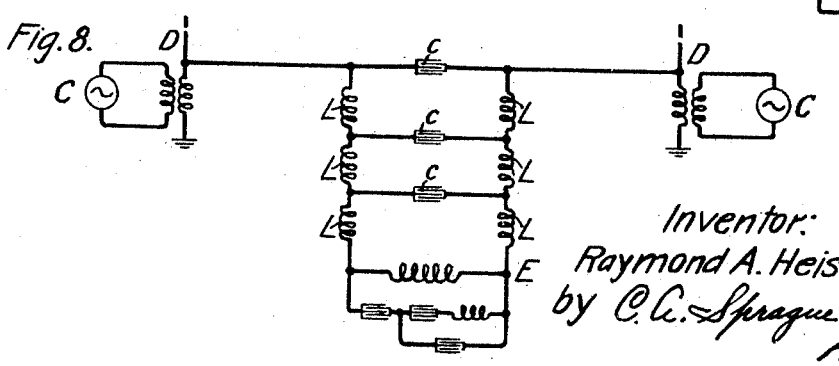
Inventor:
Raymond A. Heising.
by C. C. Sprague
Atty.

Patented Apr. 16, 1929.

1,708,944

UNITED STATES PATENT OFFICE.

RAYMOND A. HEISING, OF EAST ORANGE, NEW JERSEY, ASSIGNOR TO WESTERN ELECTRIC COMPANY, INCORPORATED, OF NEW YORK, N. Y., A CORPORATION OF NEW YORK.

SYSTEM FOR NEUTRALIZING CAPACITIVE REACTANCE BETWEEN TWO CIRCUITS PLACED CLOSE TO EACH OTHER.

Application filed August 17, 1920. Serial No. 404,259.

This invention relates to a system for neutralizing the capacitive reactance between two circuits positioned close to each other.

Mutual capacity to some extent exists between antennæ, however greatly spaced from each other. In a practical case, the spacing between two antennæ may be so small that this mutual capacity may well assume such a magnitude as to seriously impair their efficient operation, on account of cross modulation due to transfer of energy therebetween. Although it has been stated above that capacity must exist between antennæ, it would be more appropriate to state that the capacity, which must exist between any two antennæ, as it must exist between any two bodies separated by a dielectric, becomes effective to cause a displacement current to flow in the circuit of which it forms a part when a difference of potential is impressed therebetween. Ordinarily such a condition cannot readily arise in a multiple antenna system for selective operation in which the antennæ are connected to a common generator or receiver circuit. A difference of potential may, however, exist between antennæ which are fed from independent sources, as in the case cited. In this case the frequencies of the respective sources may or may not be close to each other. The necessity for eliminating the capacitive reactance increases in proportion as the frequency difference becomes less and selective tuning becomes less effective. It should be noted that, even though the two antennæ are radiating waves of the same form and amplitude, a variable difference of potential will be impressed between the antennæ if the two frequencies are different.

It is a primary object of this invention to neutralize the capacitive reactance between any two circuits whatever between which a difference of potential may exist. It may be stated as a secondary object to neutralize the capacitive reactance between any two antennæ systems, as has been pointed out.

The object of the invention is accomplished in part, when applied to antennæ systems, by interposing between the antennæ systems, a circuit which combines with the mutual capacity previously existing to constitute an anti-resonant or "trap" circuit. This interposed circuit will be designated in this specification an anti-resonating circuit as distinguished from the anti-resonant circuit of which it is a part. The anti-resonating circuit is built up of inductance and capacity in such a manner that the anti-resonant circuit is anti-resonant to each of the frequencies identified with the respective antennæ and an interchange of current is effectually prevented.

The system as briefly described above is completely effective in neutralizing the capacitive reactance between ordinary circuits, that is, between circuits which are operated at the usual frequencies. The principle of the invention is an extension of the well-known principle of branched circuits adjusted for current resonance and included in a circuit having a constant frequency source of electromotive force. In the present case the current resonant circuit is interposed between two circuits within which flow currents of different frequencies or of the same frequency.

If the circuits between which the anti-resonant circuits are interposed are high frequency circuits, and especially antennæ circuits for radio transmission, the arrangement as described is effective in part, but requires a further refinement in order to provide for the effect of the phase difference between the electromotive force across the mutual capacity and across the anti-resonating circuit, which is caused by the time interval required for the wave to be propagated up one antenna, through the mutual capacity, and down the other antenna. In this case the phase difference would occur when the anti-resonating circuit is interposed between the antennæ at the bottom of the lead-in wires thereof or at points between the bottoms of the lead-in wires and the mutual capacity. It results from the fact that the anti-resonating circuit is not connected across the mutual capacity alone as in the ideal case, but across the capacity in series with the antennæ. By means of the arrangement of this invention a distributed reactance circuit or net work is connected between the anti-resonating circuit and the bottoms of the lead-in wires. The constants of this circuit are so adjusted that the power transmitted through this circuit has the same time lag as the power transmitted through the antennæ and mutual capacity. This results in the condition that the voltages across the mutual capacity and across the anti-resonant circuit have the same relation to each other as in the first case described in which the anti-resonant circuit was connected directly across the capacity.

For a more detailed disclosure of the invention and of several forms in which it may be embodied reference is made to the description which follows, taken in connection with the accompanying drawings in which Fig. 1 shows the use of the anti-resonant circuit arrangement of the invention as applied to antennæ circuits, the mutual capacity being shown, for simplicity, as concentrated and the generator circuits being shown diagrammatically. Figs. 2, 3, 4 and 5 show various forms which a portion of the circuit shown in Fig. 1 may assume. Fig. 6 shows the system complete, as including in combination with the circuits shown in Fig. 1 the network for neutralizing the phase shift, the inductances and capacities in the antenna circuit being shown as distributed, and Figs. 7 and 8 show modified forms of the neutralizing network shown in Fig. 6.

Referring now especially to Fig. 1, the reference ordinals A and B designate two transmitting antennæ on which alternating voltage waves, having frequencies $f_1$ and $f_2$ are impressed by any one of the systems now commonly used to accomplish this function in radio telegraphy, the figure disclosing a conventional arrangement of high frequency alternator $C$, the circuit of which is coupled with the antenna circuit by means of oscillation transformer D. The mutual capacity between the antennæ is represented by condenser $C_m$. The means for neutralizing this mutual capacity is designated generally by reference ordinal E. This system comprises inductance $L_1$ in shunt with which is capacity $C_3$ in series with branched circuits $C_2$ and $L_2$. The capacity $C_3$ only is shown as variable although it is within the scope of the invention to vary such of the quantities as may be required to bring about the relationship necessary for the efficient operation of the system.

Disregarding for the moment the circuit in shunt with the inductance $L_1$, the parallel circuits which include capacity $C_m$ and inductance $L_1$ may be made to constitute a "trap" circuit, or an anti-resonant circuit, with respect to the frequency of either source. The necessary condition of current resonance results from the condition that the capacitive reactance of branch $C_m$ equals the inductive reactance of branch $L_1$, in which case the currents in the two branches acting in parallel add up to zero in the circuit in which the branch circuits are included, in this case the current from ground at one antenna, through that antenna to the other antenna, and back to ground. In effect the "trap" or anti-resonant circuit made up of the branched circuits constitutes an infinite resistance interposed in the circuit of which it is a part. Practically, since the branch $L_1$ must have resistance the condition is not exactly as stated above and the circuit may more accurately be considered to be a very high resistance circuit. The effective resistance of the circuit which contains the trap circuit may be expressed by the following general equation, as may be readily derived by a simple mathematical analysis:

$$R_{eff} = \frac{R}{(1 - L_1 C_m W^2) + R^2 C_m^2 W^2}$$

in which $R$ is the ohmic resistance of branch $L$, and $W$ is the operator $2\pi f$, $f$ being the frequency of the current flowing in the circuit of which the anti-resonant circuit is a part. If the trap circuit is tuned to resonance with the frequency $f$ so that $$L_1 W = 1/W C_m \text{ or } 1 - L_1 C_m W^2 = 0$$

the equation reduces to $$R_{eff} = R/R^2 C_m^2 W^2 = 1/R C_m^2 W^2.$$

This equation shows that if the branch circuit could be made to have zero resistance the trap circuit would interpose an infinite effective resistance. With ordinary values of resistance of an inductance coil and with the usual values of radio frequency and of mutual capacity between antennæ the effective resistance is very high. For the present purpose the current may be assumed to flow between the antennæ due to the potential impressed from either one of the sources identified by $f_1$ and $f_2$ in the drawing. If the anti-resonant circuit is tuned to frequency $f_1$ substantially no power will be delivered to antennæ circuit B from antenna circuit A, the converse being true if the anti-resonant circuit is tuned to frequency $f_2$. In the system shown in Fig. 1 the frequency $f_1$ will be assumed to be the higher frequency and the anti-resonant circuit $C_m$ and $L_1$ will be assumed to have been tuned to this frequency. As will be shown later, the circuit disclosed in shunt to $L_1$ can be made the equivalent for the present purpose of an open circuit and accordingly does not effect the conditions assumed above.

By means of the system as so far described the mutual capacity between the antennæ can be neutralized for one frequency and flow of energy in one direction (from antenna A) may be prevented. In order that no power shall be delivered to antenna A from antenna B capacity $C_m$ must be neutralized for the second frequency also. The circuit shown in shunt to inductance $L_1$ indicates an arrangement which will satisfactorily accomplish this purpose.

It is obvious that an arrangement of two branches, $C_m$ and $L_1$, as in the case just cited, cannot cause anti-resonance at both frequencies. However, the theory on which the current resonant phenomenon is based requires merely that the current in the several branches should add up so that their vectorial sum equals zero and does not forbid the use of three or more branch circuits or the use of a branch circuit which may be made up of a series-multiple arrangement of reactances. Assuming that the former alternative arrangement is possible, the latter arrangement is obviously possible, since the methods for calculating circuits which make use of complex notation provide for the conception of the conversion of a series circuit containing inductance and capacity into an equivalent parallel arrangement of circuits, the branches of which contain respectively inductance and capacity. It is therefore obvious that the complete circuit as shown may be adjusted for anti-resonance at frequency $f_2$. The branched circuit $C_2 L_2$ is included in the third circuit for the purpose of rendering this third circuit ineffective in transmitting energy from A to B at frequency $f_1$. This is accomplished by tuning circuit $C_2 L_2$ to frequency $f_1$ in the same manner as circuit $C_m L_1$ was tuned. By this means a very high resistance is interposed in the third branch circuit to current tending to flow from A to B, and in effect it removes the third circuit as far as regards the higher frequency. By means of the arrangement of circuits as above, the circuit as a whole can accordingly be made anti-resonant to both frequencies.

Since it is desired that anti-resonant circuit $C_2 L_2$ shall interpose such a high effective resistance in the third circuit as to substantially prevent the flow of current from antenna A therethrough, but that is shall permit current to flow from antenna B, the anti-resonant circuit $C_2 L_2$ should have a low effective resistance at frequency $f_2$. This may be accomplished by modifying this circuit in the manner shown in Fig. 4 or Fig. 5 in which the frequency of the circuit is anti-resonant, as before, to frequency $f_1$ but in which the circuit containing capacity $C_2$ is tuned to frequency $f_2$ by adding inductance $L_3$ in series therewith. By this means the effective resistance of the third branch is decreased for current of the lower frequency, this circuit being, nevertheless, anti-resonant to the higher frequency. The addition of the inductance $L_3$ for the purpose of tuning the circuit $C_2 L_3$ to the lower frequency may require the use of a capacity, instead of an inductance, in shunt therewith in order to tune the circuit to anti-resonance with the higher frequency. The circuit would then appear as shown in Fig. 4. It should accordingly be noted that Figures 4 and 5 do not show distinct modifications of the inventive idea, but only two possible forms which the anti-resonant circuit may assume in carrying out the single inventive idea.

In the above it has been assumed that circuit $C_m L_1$ shall be anti-resonant at the higher frequency. It is equally within the scope of the invention to tune this circuit to cause it to be anti-resonant at the lower frequency. In the latter case, in order to make the circuit as a whole anti-resonant to the higher frequency, it would be necessary to replace the capacity $C_3$ by an inductance $L_4$ as is shown in Fig. 2, or if it is more convenient to tune with a variable capacity instead of with a variable inductance, by a variable capacity in series with a relatively large inductance as shown in Fig. 3.

As has been explained, the system described above accomplishes the purpose of the invention only in part as applied to a radio system, although in large part. The system accomplishes the purpose of the invention completely as applied to circuits of the usual type and at the usual frequencies, within the limits fixed by the necessary minimum resistance included within the inductances $L_1$, $L_2$, $L_3$ and $L_4$. It should be noted, however, that the capacity $C_m$ would in most cases be so small as to cause a negligible discharge current to flow. In the particular case in which the frequencies are of the order of magnitude of radio frequencies, however, the capacitive reactance may be quite small and the discharge current relatively high. The system therefore has special application to this case. In Figs. 6, 7 and 8 are shown various modifications of a system which is arranged to completely neutralize the capacitive reactance between transmitting antennæ, each of which modifications includes a system identically as shown in Fig. 1, in combination with which is a circuit designed to neutralize the effect of the difference in phase between the voltages across the mutual capacity $C_m$ and the circuit E which exists on account of the time interval required for the wave to be propagated over the circuit between the sources. On account of this phase difference of voltages the currents in the parallel branches of the anti-resonant circuits cannot be caused to add to zero by any adjustment of the reactances there contained. In Fig. 6 this phase difference is eliminated by causing an equal time lag in the circuit between the anti-resonating circuit and the antennæ. There is accordingly no phase difference between the voltages across the capacity $C_m$ and the circuit E, and there is, in effect, a single voltage across the complete anti-resonant circuit, which includes $C_m$ and E. The additional circuit for the elimination of this phase difference is built up out of distributed inductance L and capacity C in such a manner as to simulate conditions in a long telephone cable, for example, over which high frequency is being transmitted. In this figure the actual conditions in the antennæ are reproduced by means of distributed inductance $l$ and distributed capacities $C_m$.

It has been pointed out previously in this specification that a system of branched circuits is anti-resonant at the particular frequency of the circuit in which it is included when the constants of the branch circuits are so adjusted that the currents in the branches of the anti-resonant circuit add to zero. This means, in the present case, that the current which flows through the circuit containing the anti-resonating circuit E must be equal and opposite to the current which flows through the mutual capacity $C_m$, so that these two currents add to zero in antenna B, or, in other words, so that there will be a zero electromotive force between the junction point of these circuits with antenna B and ground. It is apparent that the use of a network as in any one of the modifications shown will contribute to the accomplishment of this purpose in the particular case in which the time required for the wave to travel from one antenna to the other causes a phase shift in voltage which cannot be completely neutralized by the arrangement shown in Fig. 1. It may accordingly be alternatively stated as an object of the network to provide the required time lag to the power transmitted through the anti-resonating circuit so that it will be equal and opposite to that which passes around circuit $DAC_mBD$. It is apparent from the above alternative explanation of the function of the network that it is not necessary for the anti-resonating circuit to be at the middle point of the net-work, although it is so shown in the drawing.

It should be noted that in Figure 6 the artificial line of which the circuit E is made a part is connected between the bottom of the lead-in wires of the antennæ. The capacity load however of the net-work is constituted by the capacity inserted between this line and ground. In Figure 8 is shown a modification in which this circuit is connected between the bottoms of the lead-in wires as before, but in which it is returned on itself so that the capacitive load is constituted by condensers connected across the line. Figure 7 shows still another modification which is simpler than the modifications illustrated in Figures 6 and 8, but which occupies relatively more space. In this arrangement the conditions in a transmission line instead of being simulated are to some extent reproduced. This is accomplished by means of the expedient of running the leads some distance before connecting them to the anti-resonating circuit. This arrangement is the simplest and has the advantage over the other arrangements that it requires less care in adjustment to produce the proper time lag for both frequencies, such adjustment being obviously necessary for most efficient use. In order that conditions in the antenna circuits shall be accurately reproduced by means of the long leads between the anti-resonating circuit and the antennæ, the length of these leads must be comparable with the dimensions of the antennæ. This arrangement would ordinarily be cumbersome and unwieldy but the advantages of the arrangement as described may be compromised with the inaccuracy and disadvantages introduced by the use of coiled wire inductances by arranging the long leads in loops of relatively great radius and axial spacing. The arrangement shown in Figure 8 is about intermediate to those shown in Figure 6 and 7 as regards cubical space occupied but it more nearly reproduces the impedance load conditions in the antennæ than the arrangement of Figure 6 and is accordingly more easily adjusted to produce the proper time lag at both frequencies. This arrangement may be considered a preferred arrangement of the invention.

Although in the description and drawing disclosing the invention only two antennæ systems are shown, the principles of the invention may be extended to as many antennæ as may be desired by duplicating the arrangement shown and described for each pair of antennæ. Accordingly a circuit containing the anti-resonating circuit of the invention may be extended from each antenna circuit to each of the remaining antennæ, each circuit functioning as described to neutralize the capacitive reactance between the particular antennæ concerned.

Although the invention has been described and illustrated with reference to a radio system involving antennæ, it should be understood that the principle of the invention is equally applicable to a system for neutralizing the capacitive reactance between any two circuits whatever.

It should further be understood, that although the anti-resonating circuit and its associated net-work has been shown as connected to the lead-in conductors, this has been done only for the purpose of indicating what is understood to be at this time a practicable and an efficient arrangement and that the principle of the invention would apply if the said circuit was connected to any point on the said antennæ as, in the extreme case, at the ends most remote from the grounded ends.

What is claimed is:

1. In combination, two circuits reactively related, local means for independently impressing an alternating potential across a portion of each of said circuits, and a means interposed in a circuit between said circuits whereby interchange of current of the impressed frequencies between said circuits in either direction is prevented.

2. In combination, two circuits having capacity therebetween, local means for independently impressing an alternating potential across a portion of each of said circuits, and means interposed in a circuit between said circuits whereby the capacitive reactance of said capacity is neutralized for the frequencies of the currents traversing both circuits.

3. In combination, two circuits having mutual capacity interconnected at one point means whereby each of said circuits may transmit alternating current independently of the other, and an anti-resonating circuit in a circuit therebetween tuned with said mutual capacity to anti-resonance with the frequency of both of said alternating current circuits.

4. In combination, two circuits reactively related, local means for independently impressing an alternating potential across a portion of each of said circuits, and means interposed in a circuit between said circuits whereby interchange of energy, corresponding to the frequency of the impressed potentials, between said circuits in either direction is prevented.

5. In combination, two alternating current circuits having mutual capacity and interconnected at one point, an inductance included in a circuit parallel with said mutual capacity, said inductance being so adjusted that its reactance is numerically equal to the capacitive reactance of said mutual capacity at the frequency of one of said first mentioned circuits, and a reactive circuit in shunt with said inductive circuit which contains a system of circuits which offers a high resistance to the current of the above mentioned frequency and the reactive constants of said tuned circuit being so adjusted that the vectorial sum of the currents through said mutual capacity, inductance and shunt circuit is zero.

6. In combination, two grounded antenna circuits having mutual capacity therebetween, at least one of which circuits comprises means for impressing a difference of potential across a portion thereof, and a circuit between said antenna circuits including reactive means for neutralizing said mutual capacity for the frequencies of the impressed potentials.

7. In combination, two grounded antenna circuits operating at different frequencies and having mutual capacity, and a means interposed in a circuit between said circuits whereby the capacitive reactance of said mutual capacity is neutralized for the frequency of each of said circuits.

8. In combination, two grounded antennæ circuits operating at different frequencies and having mutual capacity, and a system of branched circuits interposed in circuit between said antennæ circuits which constitutes with said mutual capacity a circuit anti-resonant to the frequency of each of said antennæ circuits, whereby interchange of current having said frequencies between the antennæ circuits is effectually prevented.

9. The invention as defined in claim 8 in which said system of branched circuits is connected to the antennæ at the ends of the lead-in wires thereof.

10. The invention as defined in claim 8 in which said system of branched circuits is connected to the antennæ at the ends of the lead-in wires thereof and in which there is included in the circuit with said system of branched circuits a loading circuit adjusted in such a manner that impulses propagated from antenna to antenna through said circuit will have the same lag as impulses correspondingly propagated through said antenna circuits and said mutual capacity.

11. The invention as defined in claim 8 in which the said system of branched circuits is connected to the antennæ at the ends of the lead-in wires thereof, in which there is included in circuit with said system of branched circuits a loading circuit adjusted in such a manner that impulses propagated from antenna to antenna through said system of branched circuits will have the same lag as impulses correspondingly propagated through said antenna circuits and said mutual capacity, said loading circuit comprising a return circuit, having distributed inductance and capacity, the system of branched circuits being placed therein at the mid-point thereof.

12. In combination, two grounded antennæ circuits operating at independent frequencies and having mutual capacity therebetween, an inductance circuit connected between the antennæ and parallel with said mutual capacity, the inductance of which is so adjusted as to constitute with said mutual capacity a circuit anti-resonant at the frequency of one of said antennæ circuits; and a second reactive circuit connected in parallel with said inductive circuit the constants of which are adjusted so that said second circuit constitutes with the inductive circuit and the mutual capacity a circuit anti-resonant at the frequency of the other of said antennæ circuits, said second circuit including a circuit anti-resonant at the first mentioned frequency.

13. In combination two alternating current circuits reactively related and a circuit interposed between said circuits, said interposed circuit containing a loaded circuit adjusted in such a manner that impulses propagated from one of said alternating current circuits to the other will have the same time lag as the impulses correspondingly propagated through said alternating current circuits and said capacity, said interposed circuit also containing a means cooperating with said loaded circuit whereby interchange of current, having the frequencies of the currents normally flowing in said currents, between said circuits in either direction is prevented.

14. The invention as defined in claim 7, in which there is included in circuit with said circuit means, a loaded circuit adjusted in such a manner that impulses propagated from antenna to antenna through said circuit means will have the same time lag as the impulses correspondingly propagated through said antennæ circuits and said mutual capacity.

15. In combination, two circuits, local means for independently impressing an alternating potential across a portion of each of said circuits, a mutual reactance effectively forming a connection between said circuits, a circuit constituting another connection between said circuits, and a reactive element in the last mentioned connecting circuit whose reactance is of such value as to neutralize the mutual reactance between said circuits for the frequency corresponding to that of at least one of the impressed potentials.

In witness whereof, I hereunto subscribe my name this 11th day of August, A. D., 1920.

RAYMOND A. HEISING.